(12) United States Patent
Reichert et al.

(10) Patent No.: US 9,695,725 B2
(45) Date of Patent: Jul. 4, 2017

(54) COMPACT SELECTIVE CATALYTIC REDUCTION SYSTEM FOR NITROGEN OXIDE REDUCTION IN THE OXYGEN-RICH EXHAUST OF 500 TO 4500 KW INTERNAL COMBUSTION ENGINES

(71) Applicant: JOHNSON MATTHEY CATALYSTS (GERMANY) GMBH, Redwitz (DE)

(72) Inventors: Dirk Reichert, Karlsruhe (DE); Daniel Kuegel, Burgkunstadt (DE); Ilir Piluri, Bayreuth (DE)

(73) Assignee: Johnson Matthey Catalysts (Germany) GMBH, Redwitz (DE)

(*) Notice: Subject to any disclaimer, the term of this patent is extended or adjusted under 35 U.S.C. 154(b) by 0 days.

(21) Appl. No.: 14/643,282

(22) Filed: Mar. 10, 2015

(65) Prior Publication Data

US 2015/0260071 A1    Sep. 17, 2015

Related U.S. Application Data

(60) Provisional application No. 61/950,941, filed on Mar. 11, 2014.

(51) Int. Cl.
*F01N 3/20* (2006.01)

(52) U.S. Cl.
CPC ........ *F01N 3/2066* (2013.01); *F01N 2240/20* (2013.01); *F01N 2260/08* (2013.01); *F01N 2340/00* (2013.01); *F01N 2470/16* (2013.01); *F01N 2470/18* (2013.01); *F01N 2590/02* (2013.01); *F01N 2590/08* (2013.01); *F01N 2590/10* (2013.01); *F01N 2610/02* (2013.01); *F01N 2610/06* (2013.01); *F01N 2610/08* (2013.01); *F01N 2610/10* (2013.01); *Y02T 10/24* (2013.01)

(58) Field of Classification Search
None
See application file for complete search history.

(56) References Cited

U.S. PATENT DOCUMENTS 6,444,377 B1 * 9/2002 Jotcham ............... B41M 3/144
                                                       283/96
7,264,785 B2    9/2007 Blakeman et al.
(Continued)

FOREIGN PATENT DOCUMENTS

AU    2012244305 A1    11/2012
EP     0898643 A1      3/1999
(Continued)

*Primary Examiner* — Melvin C Mayes
*Assistant Examiner* — Sheng H Davis

(57) ABSTRACT

A compact Selective Catalytic Reduction (SCR) system comprising a gas flow inlet system, a vaporizer module and an SCR reactor is described. The inlet flow system is configured to provide heat to the vaporizer module, to mix reductant with the exhaust gas and to provide an approximately uniform flow of the exhaust gas through the catalyst. The vaporizer module is configured to vaporize reductant from a solution of a reductant or a precursor of a reductant and to transfer the vaporized reductant into the gas flow inlet system, where it is mixed with exhaust gas. The SCR reactor contains and SCR catalyst is in fluid communication with the inlet flow system and the vaporizer module.

21 Claims, 5 Drawing Sheets

(56) References Cited

U.S. PATENT DOCUMENTS

| | | | |
|---|---|---|---|
| 8,105,560 B2 | 1/2012 | Phillips et al. | |
| 8,302,383 B2 * | 11/2012 | Oesterle | F01N 3/206 60/286 |
| 8,499,548 B2 * | 8/2013 | De Rudder | F01N 3/2066 60/274 |
| 2009/0127511 A1 * | 5/2009 | Bruck | B01D 53/90 252/372 |
| 2010/0024379 A1 * | 2/2010 | Sengar | B01D 53/8631 60/39.5 |

FOREIGN PATENT DOCUMENTS

| | | | |
|---|---|---|---|
| KR | 20120139944 | * | 12/2012 |
| WO | 9743528 A1 | | 11/1997 |
| WO | 2011147556 A1 | | 12/2011 |

* cited by examiner

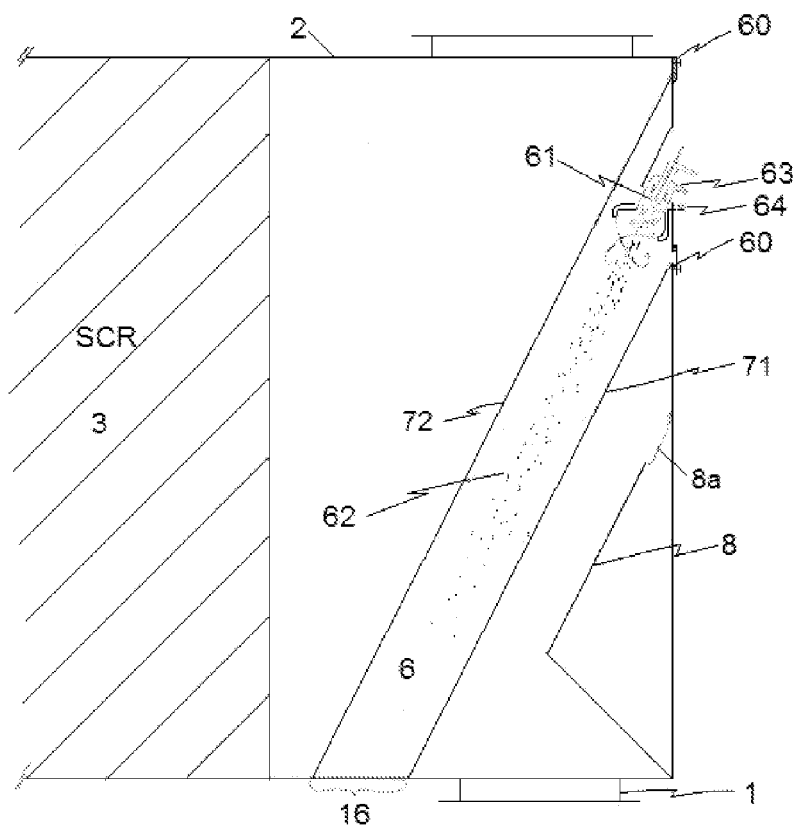
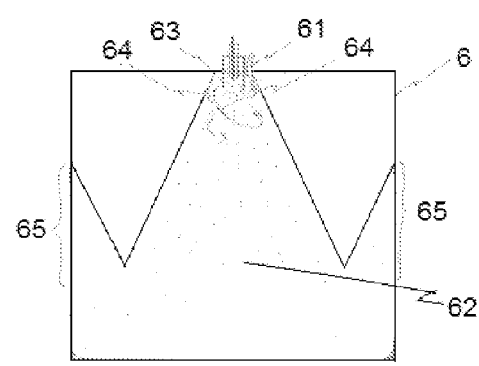
Fig. 4. a selective catalytic reduction filter (SCRF) a selective catalytic reduction filter (SCRF)

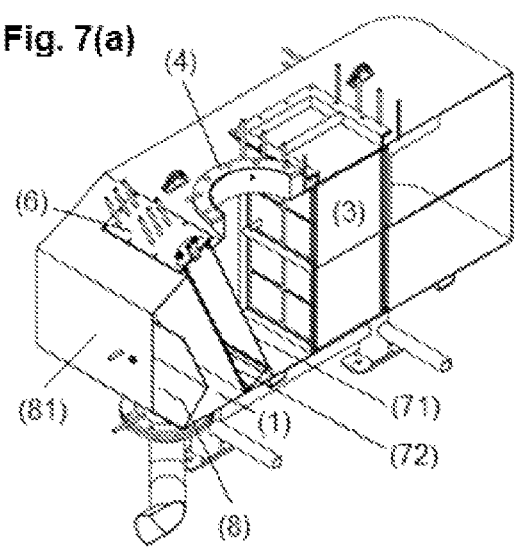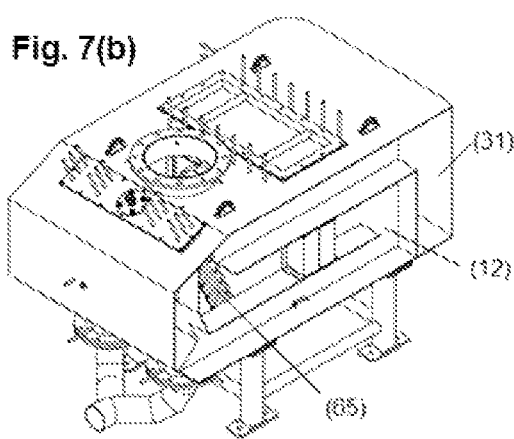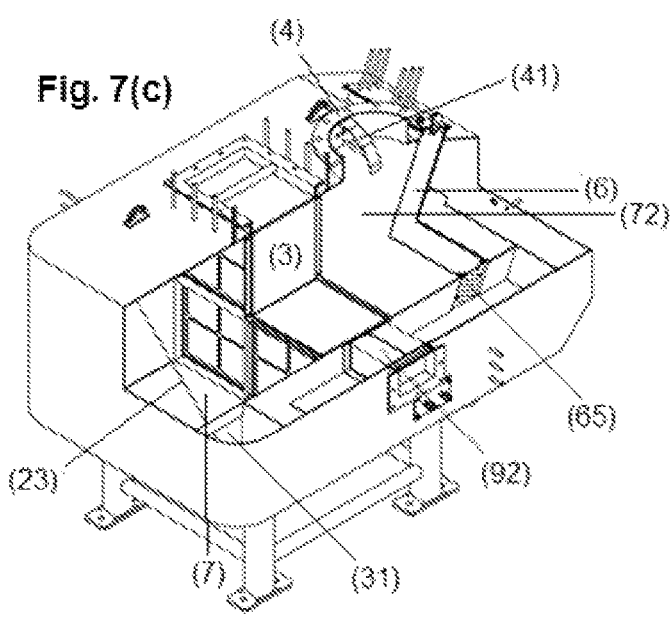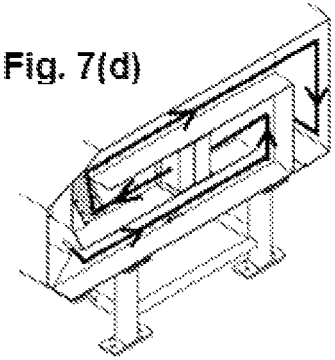

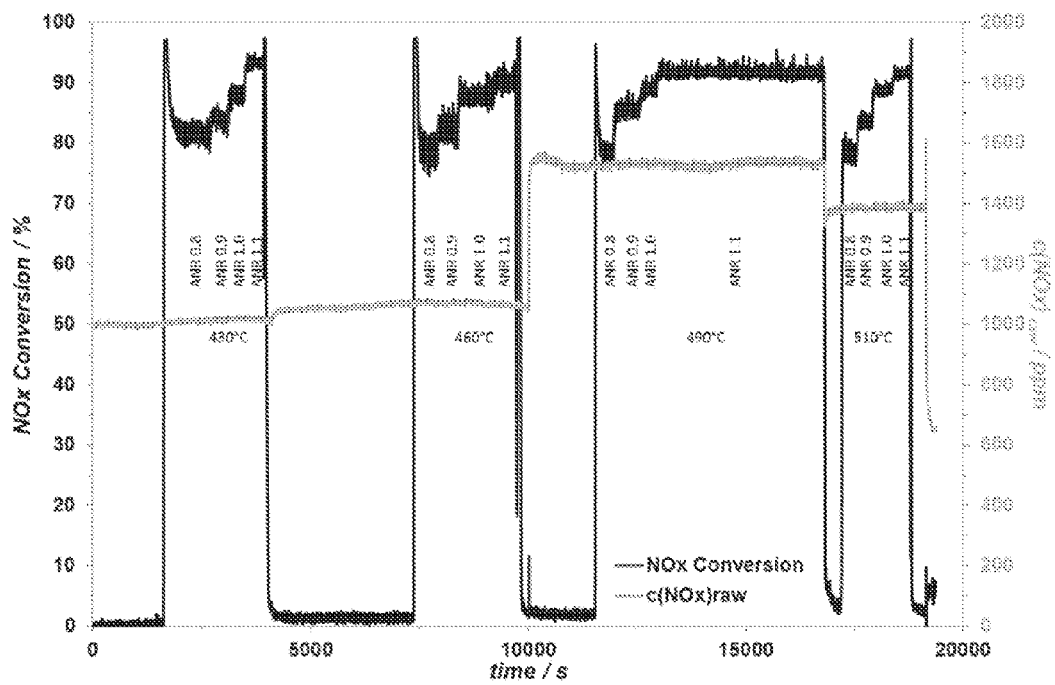

COMPACT SELECTIVE CATALYTIC REDUCTION SYSTEM FOR NITROGEN OXIDE REDUCTION IN THE OXYGEN-RICH EXHAUST OF 500 TO 4500 KW INTERNAL COMBUSTION ENGINES

CROSS-REFERENCE TO RELATED APPLICATIONS

This application claims priority to U.S. Provisional Application No. 61/950,041, filed on Mar. 11, 2014, and is incorporated herein by reference.

BRIEF DESCRIPTION OF INVENTION

The invention concerns a compact Selective Catalytic Reduction system (SCR) for the reduction of NOx in which a stream of hot exhaust gas provides heat for the decomposition of the urea into its active components including ammonia. A compact system comprising an SCR reactor, a gas flow system, and a vaporizer module is described. The SCR reactor comprises an SCR catalyst and is in fluid communication with the gas flow system and the vaporizer module. The gas flow system is located adjacent to at least four sides of the SCR reactor and is configured to heat the vaporizer module and provide an approximately uniform flow of the exhaust gas through the catalyst. The vaporizer module is configured to vaporize a solution comprising a reductant or a reductant precursor and to transfer the reductant to the flow system where it is mixed with exhaust gas and then the mixture of gases reacts in the SCR catalyst. The configuration of the compact system allows for increased decomposition of urea into the active reductant compared to state of the art systems used with 500 to 4500 Kilowatt (kW) engines.

BACKGROUND OF THE INVENTION

The selective catalytic reduction (SCR) of nitrogen oxides ($NO_x$) in flue gases is used in many industries worldwide to comply with national and international emission legislation. Nitrogen oxides formed in the combustion process of fossil and renewable fuels are reduced with a reductant, such as ammonia, on a catalytic surface. Various catalysts have been used on a variety of substrates, such as vanadium oxides, ion-exchanged zeolites, etc. The catalysts can be prepared in different formulations and can be present in different forms, such as extruded or coated honeycombs, metal substrates, etc. One of the major factors that determine the selection of the appropriate catalyst is the temperature of the flue gas. While ammonia is preferred as a reductant, the direct use of ammonia is problematic due to the hazardous nature of gaseous ammonia. Therefore, substances that are easy to handle and decompose to form ammonia when injected into the hot flue gases are normally used. For example, an aqueous urea solution decomposes at temperatures above 140° C. to form ammonia and isocyanic acid (HNCO), which then decomposes to form ammonia and carbon dioxide. However, the generation of ammonia from an aqueous urea solution is a relatively slow process. If the residence time of urea in the hot gas stream is too short, this can lead to precipitation on the reactor walls or worse, on the catalyst. Therefore, relatively long injection ducts with a length of several meters are located upstream of the actual catalyst used in current state of the art SCR applications. These long ducts are typically a straight tube through which the exhaust flows and in which the reductant is injected into the hot gas stream by means of an injector or a lance.

The SCR systems described above have generally been used on large, stationary systems, such as power plants. Smaller SCR systems have been used in automotive applications and in engines generally below 600 kW. These smaller SCR systems have different designs due to lower exhaust volumes and therefore, a smaller mass flow of reductant needed to be introduced into the system. Recently, emission regulations for 500 to 4500 Kilowatt (kW) diesel and gas engines have been established for the marine, off-road and power generation sectors. Currently the systems used in engines of these sizes consist of a long exhaust pipe (up to around 10 m) with a large diameter (up to around 0.6 m) and a SCR catalyst located in the flow of the exhaust gas. An aqueous urea solution is injected directly in the exhaust gas by means of a lance. The urea subsequently converts to ammonia in the exhaust gas flow. To achieve a uniform ammonia concentration pattern across the catalyst cross section, the flow is deliberately disturbed by static mixers. Often, ammonia is directly introduced through an ammonia injection grid (AIG) into the full exhaust flow before being passed through one or multiple mixers and then the SCR catalyst. Therefore, uneven flow distributions can result in areas with low temperature sections leading to precipitation or corrosion from the partly decomposed urea. These urea losses also result in a decrease in NOx conversion activity because precipitated material cannot participate in the reaction to convert urea to ammonia.

Space is a crucial factor in applications for marine, off-road and power generation sectors and the use of space can affect the economics of operation in these sectors. For example, a super yacht or a ferry might lose passenger space directly resulting in lost income. Large mining excavators and trucks would need to reduce the loads that they can move or carry, resulting is the need to perform additional excavations or make additional trips in order to move the same amount of material. In certain vehicles, such as tug boats, the machine rooms may not have the space required to install the current state of the art SCR equipment.

The compact SCR system described herein allows for the use of urea in reducing the levels of nitrogen oxides ($NO_x$) in exhaust gases using an SCR process in engines having a size in which exhaust aftertreatment system space constraints had previously been an obstacle to their use. One of the advantages of the compact SCR system described herein is that the system, in addition to being able to be used with new engines in the sectors described above, also allows for the installation of aftermarket systems so that existing engines will be able to reduce their emissions as well.

SUMMARY OF THE INVENTION

A compact selective catalytic reduction (SCR) system comprising a gas flow inlet system, a vaporizer module, an SCR reactor comprising an SCR catalyst and gas flow exhaust system is described. The gas flow inlet system comprises at least one exhaust gas inlet, a heat transfer area, at least two initial mixing zones and at least two flow ducts. The at least one exhaust gas inlet comprises one or more entrances for exhaust gases to enter from an engine. The heat transfer area is configured to transfer heat from exhaust gas from a combustion engine into a vaporizer module. Heat provided by the exhaust gas to the vaporization module assists in the volatilization of a solution of urea, or an ammonia precursor, which is introduced into the vaporizer module. Exhaust gas leaving the heat transfer area moves into the at least two initial mixing zones which are in fluid communication with the vaporizer module, where it combines with reductant or a precursor of a reductant to form a mixed gas. The vaporizer module comprises a means for forming a vaporized reductant from a solution of a reductant or a precursor of a reductant, a vaporizer volume comprising the vaporized reductant in the vaporizer module and a means for transferring the vaporized reductant and/or precursor of a reductant to the initial mixing zone in the gas flow inlet system. In the vaporizer module, the reductant precursor is converted to a reductant. The flow ducts can contain a series of baffles that control the residence time of the gases in the system. The flow ducts are configured to pass mixed exhaust gas around at least three sides of the SCR reactor. After passing through the flow ducts, the mixed gases pass into a passage where the gases are further mixed, then flow into the SCR reactor containing an SCR catalyst, where the mixed gases have an approximately uniform gas velocity and concentration profile across the cross section of the SCR catalyst. The mixture of reductant/reductant precursor and exhaust gas has a relatively long residence time before they are passed into an SCR catalyst. The SCR reactor is in fluid communication with the gas flow inlet system and the vaporizer module. The system does not use an ammonia injection grid (AIG), as it is often used in traditional SCR processes. After passing through the SCR catalyst, the treated exhaust gases are passed into an outlet area, which is preferably in thermal communication with the vaporizer module, and then exhausted from the system. A portion of the treated gas can be separated from the main exhaust gas flow and passed to the vaporizer module. Many of the preferred aspects of the invention are described below. Equivalent compositions are contemplated.

BRIEF DESCRIPTION OF THE DRAWINGS

The invention will be better understood and its advantages will become more apparent from the following detailed description, especially when taken with the accompanying drawings.

FIG. 3 is a representation of a cross-sectional view of an example of a compact SCR system showing a portion of the gas flow inlet system and the vaporization module where there is a single wall between the gas flow inlet system and the vaporization module and a single wall between the vaporization module and the SCR reactor.

FIG. 4 is a representation of an example of a portion of the vaporization module.

FIGS. 7*a-d* are representations of cross sections of an example showing the flow streams of the exhaust gas through an example SCR system.

FIG. 8 shows the results of an engine test bench run displaying the raw NOx concentration pre-SCR and the integral percent conversion post-SCR at different exhaust temperatures and at different ammonia:NOx ratios (ANR).

FIG. 9 shows the percent conversion of NOx at various locations on a catalyst from exhaust gas from an engine in a test bench run under real-life conditions.

DETAILED DESCRIPTION OF THE INVENTION

Figure 1:
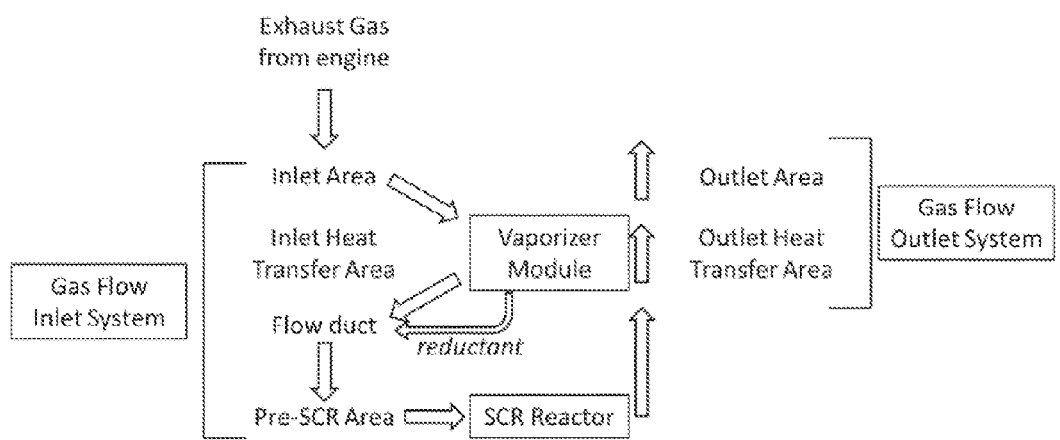
FIG. 1 shows a generalized flow of gases and reductants in a compact SCR system.

The invention provides an SCR system comprising a gas flow inlet system, a vaporizer module and an SCR catalyst. Several examples will be described, with some in preferred forms.

In one aspect of the invention, a Selective Catalytic Reduction (SCR) system comprises a gas flow inlet system, a vaporizer module and an SCR reactor; wherein:
  a. the gas flow inlet system comprising at least one exhaust gas inlet, a heat transfer area, at least two initial mixing zones and at least two flow ducts, wherein the heat transfer area is configured to transfer heat from exhaust gas from a combustion engine to a vaporizer module; each of the at least two initial mixing zones being in fluid communication with the vaporizer module and exhaust gas leaving the heat transfer area and being configured to provide a mixed exhaust gas by mixing vaporized reductant from the vaporizer module with exhaust gas; and each of the at least two flow ducts being configured to provide an approximately uniform flow of mixed exhaust gas through the SCR catalyst and to provide means of transferring heat from exhaust gas to the SCR catalyst; wherein the gas flow system is located adjacent to at least four sides of the SCR catalyst;
  b. a vaporizer module comprising a means for forming a vaporized reductant from a solution of a reductant or a precursor of a reductant, a vaporizer volume comprising the vaporized reductant in the vaporizer module and a means for transferring the vaporized reductant to the initial mixing zone in the gas flow inlet system; and
  c. an SCR reactor comprises an SCR catalyst, and is in fluid communication with the gas flow inlet system and the vaporizer module.

The heat transfer area comprises a structure configured to pass the flow of exhaust gas between the structure and a wall that is either in thermal communication with the vaporizer module or is part of the vaporizer module.

The structure can be further configured to pass the flow of exhaust gas between the structure and a first wall that is either in thermal communication with the vaporizer module or is part of the vaporizer module which comprises one or more openings through which the exhaust gas passes after having passed along the wall.

The structure can be configured to pass the flow of exhaust gas between the structure and a wall that is either in thermal communication with the vaporizer module or is part of the vaporizer module to form a portion of a passage connecting the structure to each of the at least two initial mixing zones.

The gas flow inlet system can comprise two initial mixing zones and two flow ducts.

The vaporizer module comprises at least one aerosol forming device through which a solution of a reductant, or a precursor to a reductant, is passed, preferably, the at least one aerosol forming device is a nozzle. The vaporizer module can further comprise at least one additional nozzle configured to control the shape of a droplet pattern formed by the at least one aeros The exhaust gas, after passing through the SCR catalyst, can contact a second wall in thermal contact with the gas in the vaporizer module.

The gas flow inlet system comprises at least one wall in thermal communication with the vaporizer module. The gas flow inlet system can comprise at least one wall in direct thermal communication with the vaporizer module. The term "direct thermal contact" means that a single wall having heat transferring properties separates the gas flow inlet system from the vaporizer module. Examples of where a wall is in thermal communication with a vaporizer module includes a wall being in direct thermal communication, as well as, a wall being in thermal communication through at least a second wall, and includes the use of one or more materials that provide for the transfer of heat between two or more walls. The gas flow inlet system can comprise two walls in direct thermal communication with the vaporizer module.

The vaporizer module can comprise at least one least one wall in thermal communication with the exhaust gas. In some examples, the vaporizer module comprises one wall in direct thermal communication with the exhaust gas. In other examples, the vaporizer module comprises two walls in direct thermal communication with the exhaust gas.

The gas flow inlet system can further comprise a passage connecting each of the flow ducts to the catalyst. The passage can comprise a means of directing the flow of mixed exhaust gas from the at least two flow ducts to the SCR catalysts in the SCR reactor, wherein the means is configured to provide an approximately uniform concentration of reductant across section of the catalyst. Preferably, the means of directing the flow of mixed exhaust gas from the at least two flow ducts in the SCR reactor to the SCR catalyst comprises a solid plate mounted diagonally in a connecting passage between at least two flow ducts and the SCR catalyst.

The at least two flow ducts can be configured to distribute the flow of the exhaust gases around the SCR catalyst, and the flow ducts are in thermal communication with the SCR catalyst.

Preferably, the flow of gas in each of flow ducts is approximately equal.

Preferably, at least one of the flow ducts is located on a first side of the SCR catalyst and at least one different flow duct is located on the opposite side of the SCR catalyst.

The flow ducts (preferably comprise baffle plates located and oriented to provide a uniform momentum distribution of exhaust gas upstream of the catalyst and to increase the residence time of the mixed exhaust gas.

The SCR system can further comprise a means for controlling the introduction of urea or an ammonia precursor. The means for controlling the introduction of urea or an ammonia precursor can comprise a NOx sensor.

The SCR catalyst can be in the form of a monolith or a particulate filter. The monolith or particulate filter can have a square, rectangular or circular shape in the net direction of gas flow through the monolith. When the SCR catalyst is in the form of a particulate filter, the catalyst form is known as a selective catalytic reduction filter (SCRF).

The SCR system can also include one or more other exhaust gas aftertreatment devices, such as a particulate filter, an oxidation catalyst, an ammonia slip catalyst, an SCR-coated particulate filter, etc. Preferably, an ammonia slip catalyst is placed downstream of the SCR catalyst, which can result in higher conversion efficiency of $NO_x$, especially at high exhaust gas temperatures.

At least two parallel walls in thermal communication can be located between the inlet flow of gases and the vaporizer gas volume.

A Selective Catalytic Reduction (SCR) system can comprise a gas flow inlet system, a vaporizer module and an SCR catalyst; wherein:

(a) the gas flow inlet system comprising at least one exhaust gas inlet, a heat transfer area, two initial mixing zones and two flow ducts, wherein the heat transfer area is configured to transfer heat from exhaust gas from a combustion engine to a vaporizer module through at least one wall that is either in thermal communication with the vaporizer module or is part of the vaporizer module and the heat transfer area comprises a structure having a prismatic shape, wherein a portion of the structure having a prismatic shape comprises one or a plurality of holes to pass the flow of exhaust gas between the structure and a wall of the SCR system to direct the exhaust as to each of the two flow ducts which contain the at least two initial mixing zones, the gas flow inlet system further comprises a passage connecting each of the flow ducts to the catalyst, the passage comprising a solid plate mounted diagonally in the passage between at least one flow duct and the SCR catalyst directing the flow of mixed exhaust gas from the at least two flow ducts to the SCR catalyst, wherein the solid plate is configured to provide an approximately uniform concentration of reductant across a cross section of the catalyst;

(b) the vaporizer module comprising a nozzle configured to form a vaporized reductant from a solution of a reductant or a precursor of a reductant, a nozzle configured to control the shape of a droplet pattern formed by the at least one aerosol forming device, two side walls, each side wall containing one or a plurality of openings that transfer the vaporized reductant through an initial mixing zone into the exhaust gas in the flow ducts of the gas flow inlet system and a vaporizer volume comprising the vaporized reductant in the vaporizer module; and (c) the SCR reactor comprises an SCR catalyst and is in fluid communication with the gas flow inlet system and the vaporizer module.

In another aspect of the invention, methods of reducing the amount of nitrogen oxides formed in the exhaust from an engine comprise passing exhaust gas from the engine through SCR system having the various components described herein.

The configuration of the system allows for a longer residence time and therefore better decomposition efficiency of the reductant precursor compared to state of the art systems used with 500 to 4500 Kilowatt (kW) engines. Furthermore, the system described here has an even smaller footprint.

The descriptions below provide details of various example configurations of Selective Catalytic Reduction (SCR) systems.

The system provides a reactant, preferably ammonia, which can react to reduce the levels of $NO_x$ in the exhaust gas. The reactant can be formed by converting a compound that can form ammonia, such as urea, into the reactant in the gas phase, combining the gas containing the reactant with exhaust gas containing $NO_x$ and then passing the combined gases through an SCR catalyst. In order to convert the urea to ammonia, an aqueous solution of urea is injected into the vaporizer module and heat from the exhaust is transferred through the at least one wall into the vaporizer module where both the water and the urea volatilize and become present as hot vapors. Hot cleaned gas can be obtained from cleaned gas that is formed after the mixture of ammonia and exhaust gas is passed through the SCR catalyst is used to vaporize the solution of urea.

The apparatus and process described herein is effective with urea, but can utilize other $NO_x$-reducing reagents, either ammonia-forming or other $NO_x$-reducing reagents, capable of forming a reactant gas upon heating. The reactions that occur are well known in the art. A summary of these reactions are described in U.S. Pat. Nos. 8,105,560 and 7,264,785, which of which is incorporated by reference in its entirety.

The term "urea" is meant to include urea, $CO((NH_2)_2)$ and reagents that are equivalent to urea because they form ammonia and HNCO when heated. Other $NO_x$-reducing reagents known in the art can also be used. $NO_x$-reducing reagents that do not form urea or HNCO, but react with compounds present in exhaust gas to reduce the levels of $NO_x$, can be used.

The volume of urea solution introduced into the vaporizer module is dependent upon both the $NO_x$ mass flow and the concentration of urea in the solution. The amount of urea introduced is related to the $NO_x$ concentration based on the stoichiometry of the reactions involved, the temperature of the raw exhaust gas and the catalyst to be used. The amount of urea used is related to the "NSR", which refers to the relative equivalents of nitrogen in the urea, or other $NO_x$-reducing agent, to the equivalents of nitrogen in the $NO_x$ in the gases to be treated. The NSR can range from about 0.1 to about 2, but preferably is within the range from 0.6 to 1.2, inclusive.

The SCR catalyst used in the compact SCR system described herein can be selected from those known in the art as being capable of reducing the concentration of nitrogen oxides in the presence of ammonia. These include, for example, zeolites, oxides of vanadium, tungsten, titanium, iron, copper, manganese, and chromium, noble metals such as the platinum group metals platinum, palladium, rhodium, and iridium, and mixtures thereof. Other SCR catalyst materials conventional in the art and familiar to the skilled artisan, such as activated carbon, charcoal or coke, can also be utilized. Preferred catalysts include transition metal/zeolites e.g. Cu/ZSM-5 or Fe/Beta; vanadia-based catalysts such as $V_2O_5/WO_3/TiO_2$; or non-zeolite transition metal catalysts such as $Fe/WO_x/ZrO_2$.

These SCR catalysts are typically mounted on a support such as a metal, ceramic, zeolite, or are extruded as a homogeneous monolith. Other supports known in the art can also be used. It is preferred that the catalysts are coated onto a flow-through monolith substrate, a filter substrate or in an extruded form. Most preferable, the catalysts are coated onto a flow-through monolith substrate or are in an extruded form. It is preferred that these catalysts are present in or on a honeycomb flow-through support. For a small volume SCR system, SCR catalysts with relatively high cell densities are preferable, for example 45 to 400 cells per square inch (cpsi), more preferable 70 to 300 cpsi and even more preferable 100 to 300 cpsi.

A generalized flow of gases and reductants is shown in FIG. 1. The compact SCR system comprises four main sections: a gas flow inlet system, a vaporizer module, an SCR catalyst and a gas flow outlet system. The gas flow inlet system comprises an inlet area, an inlet heat transfer area flow ducts and a pre-SCR area. The gas flow outlet system optionally comprises one or more of an outlet heat transfer area and a clean gas outlet.

Figure 2:
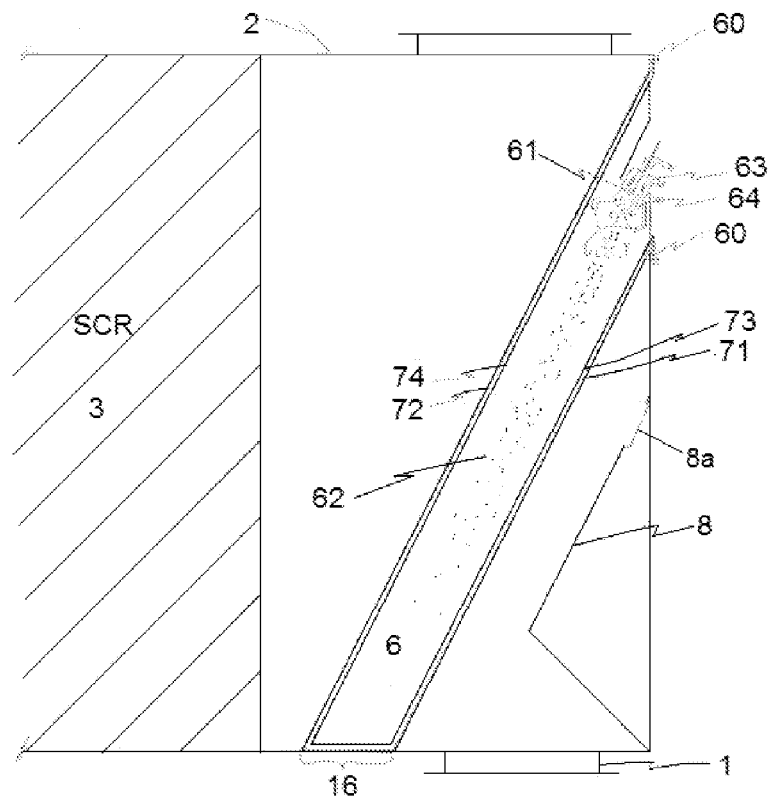
FIG. 2 is a representation of a cross-sectional view of an example of a compact SCR system showing a portion of the gas flow inlet system and the vaporization module where both the gas flow inlet system and the vaporization module contain walls adjacent to each other when the vaporization module is placed in the SCR system.

FIG. 2 shows a representation of half-section view of a compact SCR system 2 showing a portion of the gas flow system and the vaporizer module 6. The compact SCR system can receive exhaust gases from an engine producing between about 500 kW and about 1000 kW (1 MW), or from about 1000 kW (1 MW) to about 2000 kW (2 MW), or from about 2000 kW (2 MW) to about 4500 kW (4.5 MW). FIG. 2 shows an example in which engine exhaust gas flows into the SCR system through inlet flange 1 which can be a single entrance flange for a single stage engine. Two or more entrances for a two-stage engine or other combustors can be used. Typically, and for a preferable flow pattern, round entrances into the system like tubes/flanges would be used but other shapes may also be used like square, rectangular, triangular or oval shape. Upon entering the inlet area of the gas flow system, the hot exhaust gas impinges on gas collector 8 and flows along wall 71, which functions as a heat exchanger in the inlet heat transfer area. The gas collector 8 shown in FIG. 2 has a prismatic shape. The gas collector 8 can have a different shape. After passing this heat transfer area, the gas flows through a portion 8a of the gas collector 8 comprising one or a plurality of openings that allow the gas to pass through the gas collector to an inside area of gas collector 8 between the gas collector 8 and an outside wall of the SCR system. From the inside of the gas collector 8, the exhaust is distributed into the at least two flow ducts and further into the initial mixing zones located on the other side of the compact SCR system. In the initial mixing zones, the exhaust gas from the engine is mixed with vaporized reductant from the vaporizer module. When the compact SCR system comprises more than one exhaust entrance 1, the gas flow inlet system equilibrates differences between the streams, such as pressure and/or temperature.

The vaporizer module 6 comprises a means for injecting an aqueous solution of urea between two hot plates. The volume between the two hot plates is the vaporizer gas volume 62. The aqueous solution of urea is maintained at a concentration suitable for storage and handling without precipitation or other problems. The concentration of urea in the aqueous solution can range from about 5 to 70%, preferably from about 15 to about 60%, more preferably from about 30 to about 40%. The means for injecting an aqueous solution of urea can comprise a nozzle that uses air for spray formation (pre-evaporation) of the urea solution. This type of nozzle is commercially available from a number of sources. For an engine size between 500 and 4500 kW, commercially available nozzles that can be used with urea only require low pressure vaporization air, which can be supplied by a relatively small compressor.

The vaporizer module 6 can be fitted with an airless nozzle. Currently available, one-phase, airless nozzles for the urea mass flows necessary for cleaning the exhaust of engines between 500 and 4500 kW need very high liquid pressures to operate at varying mass throughputs in one operation cycle. However, nozzle manufacturers are researching and developing low pressure one-phase nozzles with adaptable mass throughputs. Airless systems can have lower investment and operating costs and may have a lower potential of system failures because they have fewer components. Airless injection systems may be especially attractive for compact SCR systems for which space is constraint and for which long warranty periods (e.g. two and more years) are requested and the engine has a high annual utilization (of e.g. 8000 hours per year) such as marine, power generation, mining etc. Other types of atomizers can also be used.

Heat needed for the complete evaporation of the water and decomposition of urea into ammonia is supplied by the transfer of heat from the exhaust gas through the heat exchange functionality of one or more walls 71-74 between the exhaust gas and the vaporizer gas volume 62.

The vaporizer module can contain at least one wall and use preheated secondary vaporization air. Preheated secondary vaporization air may be used to impact on the urea solution spray out of the nozzle. Therefore, it provides a means to control and/or adjust the distribution of urea and ammonia or another reductant in the exhaust gas, therefore provides control of the aqueous urea evaporation/decomposition time and, therefore the possibility to achieve the highest possible NOx reduction at the lowest possible ammonia slip.

The SCR system described above can be modified, as described below, to replace the two sets of double walls 71, 73 and 72, 74 with two single walls. In an example, each of the two walls 71, 72, as shown in FIG. 3 is part of the gas flow system. In another example, each of the two walls 71, 72, as shown in FIG. 3 are part of the vaporizer module.

FIG. 4 depicts a portion of the SCR system in which an aqueous urea solution is atomized in a commercial nozzle 61 with the help of pressurized, primary vaporization air. Primary vaporization air is the air that is used to convert the solution containing the reductant into droplets. Pressure of only a few hundred millibars to a few bar is sufficient to obtain droplets with diameters of a few tens of millimeters to a few tens of micrometers, even at varying mass throughputs. Therefore, a compact device, such as a rotary piston fan, side channel blower, etc. can be used rather than a large air compressor as is currently used in state of the art installations. The pressurized air can also be used as secondary vaporization air in forming a desired spray profile formed by the droplets. A portion of the secondary vaporization air can be blown through two separate nozzles 63 into the primary aqueous urea spray to elongate the spray profile to a flat jet for increased heat and mass transfer surface. Because of the low spray/vapor velocity and the relatively high temperature in the vaporizer gas volume 62, complete or near complete thermolysis of urea into ammonia and isocyanic acid is anticipated. Furthermore, due to the very high local concentration of steam (formed from the volatilization of water in the aqueous urea solution) and the absence of diluting exhaust gas in the vaporizer gas volume 62, urea is expected to rapidly hydrolyze to isocyanic acid before it is mixed with the exhaust gas in the initial mixing zones. A small overpressure of a few millibars in the vaporizer module 6 results in a constant and stable flow of the reductant and the associated by-product gases via orifices 65 into the two flow ducts 11 and 12 on either side of the SCR reactor.

Secondary vaporizer air can also be fed into a rectangular vaporizer duct through at least one, preferably two or more, nozzles 64 to create a swirl flow in the vaporizer gas volume 62 in order to increase the heat transfer from the walls into the spray. Secondary vaporization air can be heated before it is directed to the nozzles 63 and 64. The heating may be performed by any known means, preferably electrically, more preferably by exhaust as passing through a tube heat exchanger located on walls 71 and 72. The heat exchanger tubes are arranged so that only a small fraction of the surface area of walls 71 and 72 is blocked, while allowing the needed amount of heat transfer into the secondary vaporization air stream. The total mass flow and pressure of the secondary vaporization air stream is determined by the desired spray elongation pattern and the desired swirl flow pattern, as well as, the desired pressure and temperature in the vaporizer module 6. The vaporizer module 6 can also comprise baffle plates that are oriented to direct the spray. The walls and/or baffle plates of the vaporizer module can also provide catalytic activity for the hydrolysis of a reductant precursor. The vaporizer module 6 can be a slide-in module so that it can be easily removed from the compact SCR system for cleaning in case a reductant solution of low grade should be used. The vaporizer module 6 can be part of the compact SCR system where the walls 71 and 72 separate the exhaust gas from the gas volume 62 inside the vaporizer module 6.

Figure 5:
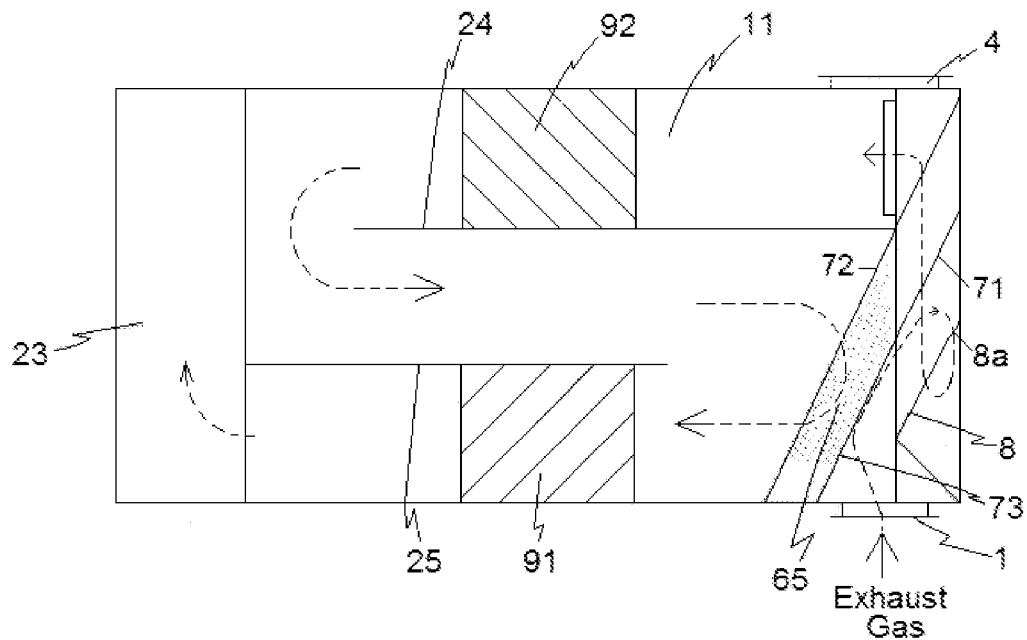
FIG. 5 is a representation of a half-section view showing the exhaust flow trajectory through a portion of an example SCR system.

FIG. 5 depicts the flow of exhaust gas in the side view in an exemplary configuration. The portion of the gas flow shown in the right side of FIG. 5 shows the flow through the inlet area, as described below. Hot exhaust gas from the engine flows into the compact SCR system through inlet flange 1. Upon entering the system, the gas flow impinges on gas collector 8 and flows in the inlet heat transfer area along the inlet heat exchanger section comprising an angled wall 71 that acts as a heat exchanger. A heat exchanger tube for heating secondary vaporization air can be located on this wall. (This is not shown in FIG. 5). The gas collector 8 shown in FIG. 5 has a prismatic shape. The gas collector 8 can have a different shape. After passing this inlet heat transfer area, the gas flows through a portion 8a of the prismatic-shaped gas collector 8 comprising one or a plurality of openings that allow the gas to pass through the gas collector to an inside area of gas collector 8 between the gas collector 8 and an outside wall of the SCR system. From the inside of the gas collector 8, the exhaust is distributed into the at least two flow ducts and further into the initial mixing zones located on the other side of the compact SCR system and then into the flow duct 11 and 12 on either side of the SCR reactor. The exhaust gas can flow through a series of baffle plates 24, 25 orientated so that the exhaust gas travel time is increased before the reductant enters the exhaust gas in the initial mixing zones which are located in the exhaust flow bend where the reductant is transferred through one or multiple openings 65 from the vaporizer module into the flow ducts 11, 12. Increased exhaust gas travel time before reductant introduction is beneficial, if a NOx sensor is used for control of the reductant dosing amount and if this NOx sensor is a part of the compact SCR system, cf. number 81 in FIG. 7a. Exhaust gas travel time before the ammonia-laden gas is introduced can be increased through a series of baffle plates in the exhaust duct that adjust gas flow as the exhaust gas travels to the rear of the compact SCR system, then back to the front and again to the rear. The term "front" refers to the side of the system where the injection module is located. The term "back" refers to the side opposite of the front of the system. As the exhaust gas passes the second turn-around, the ammonia-laden gas from the vaporizer module 6 enters the exhaust through one or more openings 65 in the vaporizer module. The turbulence of the gas flow in the flow bend effectively facilitates the mixing of reductant and exhaust gas in the mixing zones, which are part of the gas flow area. The baffle plates can be positioned approximately horizontal.

Figure 6:
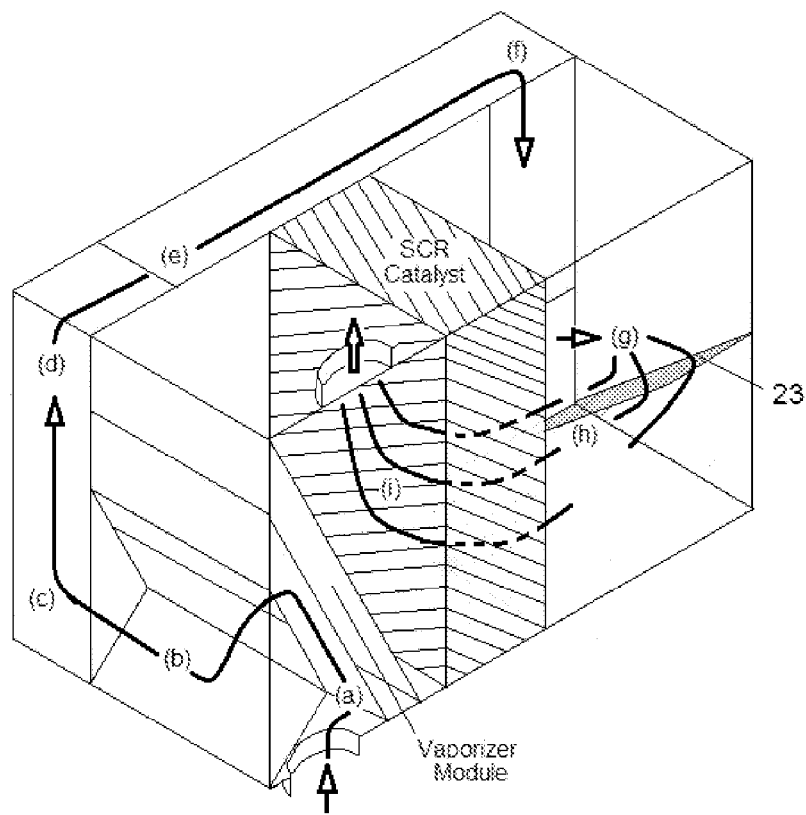
FIG. 6 is a representation of the exhaust flow trajectory through a portion of an example SCR system.

The gas flow area comprises initial mixing zones where exhaust gas from the engine that has passed through the inlet area is mixed with vaporized reductant from the vaporizer module and flow ducts 11 and 12 through which the mixture of exhaust gas and reductant flows before entering the pre-SCR area. The flow ducts are located around the SCR catalyst and transfer heat to the SCR catalyst. FIGS. 6 and 7 show examples where the flow ducts are located around the sides of the SCR catalyst. The flow ducts can go above and below the SCR catalyst. The flow ducts can be located around one or more sides and above/or below the SCR catalyst. A static mixer 91 and/or an oxidation catalyst 92 can be placed in the exhaust flow ducts before the SCR catalyst, as shown in FIG. 5. After traveling the length of the flow ducts, the direction of flow in each flow duct 11 and 12 is turned by 90° and is directed towards an angled flow plate 23 located in a connecting passage 31 between the two flow ducts 11 and 12 of the pre-SCR area which is located upstream of the SCR catalyst to achieve a uniform momentum distribution across the cross section of the catalyst. The gas flow in each of the flow ducts 11 and 12 can be approximately equal. By approximately equal, it is meant that, for example in a system having two flow ducts, that the mass flow rates range from about 50:50 to about 65:35, preferably from about 50:50 to about 60:40, and more preferably from about 50:50 to about 55:45. The ratios of the mass flow in a plurality of flow ducts should be adjusted to provide a uniform concentration of ammonia, or other reductant, across the cross section of the SCR catalyst.

FIG. 6 depicts the gas flow in a preferred exemplary configuration of a compact SCR system, where the SCR system is shown cut in half from front to back. Hot exhaust gas enters the compact SCR system through the inlet flange at the bottom of the SCR system. The gas flows upward (a) between the gas collector (8) and a wall 71 between the inlet and the vaporizer module in the inlet heat transfer area; the gas then flows through opening 8a in the surface of gas collector 8 and through the inner volume (b) of the gas collector 8 where it is distributed into the flow ducts 11 and 12 on both sides of the SCR system through opening (c). In one example, the gas then flows upward (d) and through the flow duct with a series of baffle plates along the length of the SCR system from (e) to (f) where it is turned around and flows back to the front of the system, towards the reductant introduction and initial mixing zone 65 (not depicted in FIG. 6, See FIG. 5). In the initial mixing zones, the exhaust gas from the engine is mixed with vaporized reductant from the vaporizer module. The mixed gases flow to the rear of the system, are turned around by 90 degrees into the connecting passage between the at least two flow ducts and the pre-SCR area and then impinge on plate 23. The mixed gases are directed across (g) the angled flow plate 23, so that the location and orientation of the angled flow plate 23 provides a substantial uniform flow of gases (h) towards the SCR catalyst 3.

FIG. 7 shows several three dimensional drawings of an example of an SCR system showing the flow of exhaust gas through the system. Hot exhaust gas from an engine enters the system through an inlet 1, then travels upwards between the gas collector 8 and a wall 71 (located adjacent to the vaporizer module 6). The hot exhaust gas transfers heat to the wall 71 which then transfers the heat into the vaporizer module 6. In the inner volume of gas collector 8, the gas flow splits into two portions and is distributed into the two flow ducts 11 and 12 located on the left and right sides of the system. Neither of these ducts can be seen in FIG. 7a. FIG. 7b shows a cut-out view of the SCR system with the right side wall of the flow duct 12 removed to show the inner volume of flow duct 12. From the gas collector 8, the exhaust flows into flow duct 12, to the rear, back to the front where the ammonia enters the exhaust through openings 65 in the vaporizer module before the mixed gases flow again to the rear and through the connecting passage 31 into the pre-SCR area 7. FIG. 7c shows the system rotated 180 degrees from FIG. 7b and shows a portion of flow duct 11. A static mixer and/or an oxidation catalyst can be present in the flow ducts 11 and/or 12. FIGS. 7b and 7c show examples were an oxidation catalyst 92 is located in the flow ducts. FIG. 7d shows the generalized flow of gases through flow duct 12. As the exhaust as flows through flow ducts 11 and 12, heat from the exhaust gas is transferred through the walls of the flow duct and some of this heat is transferred to the catalyst and the area surrounding the catalyst. In FIG. 7d, the end of the flow shown occurs with the flow entering connecting passage 31. After entering connecting passage 31, the exhaust gas contacts the angled flow plate 23 and is directed through the pre-SCR area towards the SCR catalyst 3. After passing through catalyst 3, where the gas is cleaned, the cleaned exhaust gas travels upward along wall 72 (located adjacent to or being the wall of the vaporizer module 6). The hot cleaned exhaust gas transfers heat to the wall 72 which then transfers the heat into the vaporizer module 6. The gas then flows upwards and through outlet flange 4 before it leaves the SCR system.

SCR catalyst is located within the SCR system. The term "within" as used herein, means that the SCR catalyst has the gas flow inlet system, the vaporizer module and the gas flow outlet system located on at least four sides of the SCR catalyst.

The catalyst is preferably in the form of bricks, which are shown in FIGS. 6 and 7a and 7c. The SCR catalyst bricks can have any of a number of cross-sectional shapes perpendicular to the direction of the gas flow, including square, rectangular, hexagonal and circular, with square or rectangular being preferred for higher utilization of the cross-sectional area. A plurality of SCR catalyst bricks can be used which are preferably square and have a cross section of about 150×150 mm$^2$. Several layers of catalyst can be placed into the gas flow. In addition to the SCR catalyst, the SCR system can comprise other emission control devices, such as particulate filters, ammonia slip catalysts, oxidation catalysts and coated particulate filters.

The SCR system can further comprise an oxidation catalyst located upstream of the urea input in each flow duct to reduce hydrocarbons which may decrease SCR activity. The oxidation catalyst also oxidizes CO, aromatics, etc.

When the exhaust gas passes through the catalyst 3, NOx in the exhaust gas reacts with reductant on the catalyst surface and the amount of NO$_x$ in the exhaust gas is reduced. For the SCR reaction to be effective in reducing NOx levels, the temperature of the combustion gases including the gasified urea should be at least about 100° C., typically between about 180° and about 650° C., and preferably above at least about 250° C. The composition, form and especially the volume of the catalyst can be selected based on the temperature of the gases in the SCR catalyst, as well as, the NOx load to provide for a reduction in the catalytic reduction of nitrogen oxides. Other exhaust gas cleaning devices, such as an ammonia slip catalyst, particulate filter and SCR, SCR-coated particulate filter etc., can also be used in the compact SCR system Preferably, the compact SCR system does not use an ammonia injection grid (AIG) as is often used, or required, in traditional SCR processes.

The compact SCR system can further comprise a means to access the SCR catalyst to replace the catalyst. Preferably, the means is a door located on the top or the side of the SCR system.

The compact SCR system can further comprise various sensors, such as one or more NOx sensors, an NH$_3$ (ammonia) sensor, and temperature sensors. An NH$_3$ sensor would preferably be placed at the outlet of the SCR system to measure the ammonia slip through the SCR system. The NOx and/or NH$_3$ and/or temperature sensors can be linked to a unit that controls the amount of urea and vaporization air and, if applicable, clean gas that is transferred into the vaporizer module and subsequently into the exhaust gas. A NOx sensor 81, as optionally a temperature sensor can be located at the exhaust gas flow inlet system, preferably in gas collector 8. A NOx or NH$_3$ sensor can be located downstream 41 of the SCR catalyst and can be used for closed-loop control. An angled or bent baffle plate can direct a partial flow of the center flow of clean gas towards the NOx or NH$_3$ sensor to measure the NOx or NH$_3$ levels to determine the amount of ammonia slip through the SCR catalyst.

The compact SCR system can comprise one or two inlet flanges to pass exhaust gases from single- or double stage (e.g. V-cylinder) engines having power of 500 to 4500 kW. Preferably, the flanges are circular.

An SCR system with a configuration shown in FIG. 7 was evaluated in a test bench run under real-life conditions. The SCR catalyst tested used 4 by 4 square (150×150 mm$^2$) extruded vanadia catalysts with a length of 300 mm each, where 2 by 2 catalyst bricks were combine canning with a metal sheet and a mat. The vaporizer module used a two-phase nozzle (air-assisted) and used air at 4 bars and consumption of approximately 1 Nm$^3$/h. The system was tested with ammonia:nitrogen oxide ratios (ANR) of 0.8, 0.9, 1.0 and 1.1.

The SCR system was connected to a Mercedes OM512 engine (16 L displacement) 430 kW. The exhaust temperatures, post turbo, were from 430-510° C. NOx conversion measured post outlet flange for different ammonia to NOx ratios against time are shown in FIG. 8. These values are the actual measurement from when the local NOx conversion was measured.

The conversion of NOx at various locations across the catalyst was determined using exhaust temperature, post turbo, of 490° C., with a mass flow of the exhaust of 1200 kg/h. The concentration of NOx raw was 1500 ppm and the ammonia:nitrogen oxide ratio (ANR) was 1.1. Local NOx post SCR was measured so, that the NOx conversion in the center of each catalyst brick layer was determined at heights of 7, 22, 37 and 52 centimeters measured from the bottom of the reactor. At each of the heights, measurements were taken across the width of the catalyst at 5, 15, 25, 35, 45, 55 and 65 centimeters from left to right of the catalyst cross section. This resulted in measurements being taken in a 7×4 (width×height) grid. The percent conversion at each of these points is shown in FIG. 9.

FIG. 9 shows the percent conversion of NOx at various locations on a catalyst from exhaust gas from the engine in a test bench run. These results show the near-quantitative utilization of the whole cross section of the catalyst can be achieved using the configurations described above. Very high NOx conversion was achieved using stationary engine operating points, as well as, within a transient test cycle with a compact SCR system designed and tested within the engine power range targeted by this invention.

Uniform exhaust flow across the catalyst results in an equalized utilization of the catalyst and provides maximum NOx conversion. The exhaust passes through the SCR catalyst where the levels of NO$_x$ become reduced by the reaction with the reductant in the presence of the catalyst and a cleaned gas is formed. Cleaned gas exiting the SCR catalyst enters the gas flow outlet system, where some or all of the gas contacts a wall 72 between the gas flow outlet system and the vaporizer module 6 in the outlet heat transfer area and heat from the cleaned gas is transferred into the vaporizer module. After having passed the outlet heat transfer area, the cleaned exhaust gas in the gas flow outlet system leaves the compact SCR system.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

The invention claimed is:

1. A Selective Catalytic Reduction (SCR) system comprising a gas flow inlet system, a vaporizer module and an SCR reactor; wherein:
   a. the gas flow inlet system comprises at least one exhaust gas inlet, a heat transfer area, at least two flow ducts and at least two initial mixing zones, wherein the heat transfer area is configured to transfer heat from exhaust gas from a combustion engine into a vaporizer module through at least one wall that is either in thermal communication with the vaporizer module or is part of the vaporizer module and a gas collector to pass the flow of exhaust gas towards the flow ducts in which the reductant, generated in the vaporizer module enters the exhaust flow before it flows to the catalyst, further comprising the passage from the flow ducts to the SCR reactor in which a solid plate is mounted diagonally between the at least two flow ducts and the SCR reactor, directing the flow of mixed exhaust gas from the at least two flow ducts to the SCR reactor wherein the solid plate is configured to provide an approximately uniform momentum distribution and reductant concentration across a cross section of the catalyst;
   b. the vaporizer module comprises a nozzle configured to form a vaporized reductant from a solution of a reductant or a precursor of a reductant, a nozzle configured to control the shape of a droplet pattern formed by the vaporizer module, two side walls, each side wall containing a plurality of openings that transfer the vaporized reductant into an initial mixing zone in the gas flow inlet system and a vaporizer volume comprising the vaporized reductant in the vaporizer module; and
   c. the SCR reactor comprises an SCR catalyst and is in fluid communication with the gas flow inlet system and the vaporizer module.

2. The Selective Catalytic Reduction (SCR) system of claim 1, wherein the heat transfer area comprises a structure configured to pass the flow of exhaust gas between the structure and a wall that is either in thermal communication with the vaporizer module or is part of the vaporizer module.

3. The Selective Catalytic Reduction (SCR) system of claim 2, wherein the structure is further configured to pass the flow of exhaust gas between the structure and a first wall that is either in thermal communication with the vaporizer module or is part of the vaporizer module comprises one or a plurality of openings through which the exhaust gas passes after having passed along the wall.

4. The Selective Catalytic Reduction (SCR) system of claim 1, wherein the vaporizer module comprises at least one aerosol forming device through which a solution of a reductant, or a precursor to a reductant, is passed.

5. The Selective Catalytic Reduction (SCR) system of claim 1, wherein exhaust gas, after passing through the SCR reactor, contacts a second wall in thermal contact with the gas in the vaporizer module.

6. The Selective Catalytic Reduction (SCR) system of claim 1, wherein the gas flow inlet system comprises at least one wall in thermal communication with the vaporizer module.

7. The Selective Catalytic Reduction (SCR) system of claim 1, wherein the gas flow inlet system comprises at least one wall in direct thermal communication with the vaporizer module.

8. The Selective Catalytic Reduction (SCR) system of claim 1, wherein the gas flow inlet system comprises two walls in direct thermal communication with the vaporizer module.

9. The Selective Catalytic Reduction (SCR) system of claim 1, wherein the vaporizer module comprises at least one wall in thermal communication with the exhaust gas.

10. The Selective Catalytic Reduction (SCR) system of claim 1, wherein the vaporizer module comprises one wall in direct thermal communication with the exhaust gas.

11. The Selective Catalytic Reduction (SCR) system of claim 1, wherein the vaporizer module comprises two walls in direct thermal communication with the exhaust gas.

12. The Selective Catalytic Reduction (SCR) system of claim 1, wherein the gas flow inlet system further comprises a passage connecting each of the flow ducts to the SCR reactor.

13. The Selective Catalytic Reduction (SCR) system of claim 1, wherein the at least two flow ducts are configured to distribute the flow of the exhaust gases around the SCR reactor, and the flow ducts are in thermal communication with the SCR reactor.

14. The Selective Catalytic Reduction (SCR) system of claim 1, wherein at least one of the flow ducts is located on a first side of the SCR reactor and at least one other flow duct, different than the flow duct located on a first side of the SCR reactor, is located on the opposite side of the SCR reactor.

15. The Selective Catalytic Reduction (SCR) system of claim 1, wherein the flow ducts comprise baffle plates located and oriented to provide a uniform momentum distribution of exhaust gas upstream of the catalyst.

16. The Selective Catalytic Reduction (SCR) system of claim 1, wherein the flow of mixed exhaust gas through the SCR reactor comprises the mixed exhaust gases having a net direction of flow though a monolith and the at least one SCR catalyst is in the form of a monolith or a particulate filter having a square, rectangular or circular shape in the net direction of gas flow through the monolith.

17. The Selective Catalytic Reduction (SCR) system of claim 1, wherein the SCR system further comprises at least one of an ammonia slip catalyst, a particulate filter and an oxidation catalyst.

18. The Selective Catalytic Reduction (SCR) system of claim 1, wherein at least two parallel walls in thermal communication are located between the inlet flow of gases and the vaporizer gas volume.

19. A method of reducing the amount of nitrogen oxides formed in the exhaust from an engine, the method comprising passing exhaust gas from the engine through an SCR system of claim 1.

20. The Selective Catalytic Reduction (SCR) system of claim 1, wherein the gas flow inlet system comprises two flow ducts and two initial mixing zones.

21. A method of reducing the amount of nitrogen oxides formed in the exhaust from an engine, the method comprising passing exhaust gas from the engine through an SCR system of claim 1.

* * * * *